C. A. WILLIAMS.
Thill-Coupling.
No. 213,796. Patented April 1, 1879.
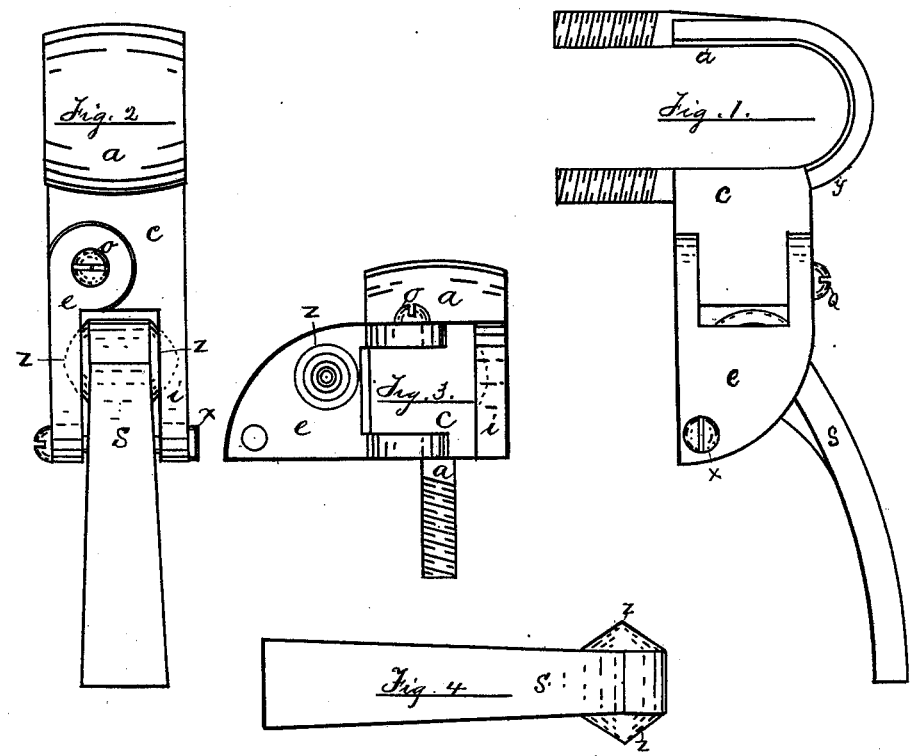
Witnesses
Thos. H. Hutchins
Wm. J. Hutchins
Inventor
Charles A. Williams

UNITED STATES PATENT OFFICE.

CHARLES A. WILLIAMS, OF JOLIET, ILLINOIS, ASSIGNOR OF ONE-HALF HIS RIGHT TO SOLOMON WILLIAMS, JR., OF SAME PLACE.

IMPROVEMENT IN THILL-COUPLINGS.

Specification forming part of Letters Patent No. 213,796, dated April 1, 1879; application filed July 22, 1878.

*To all whom it may concern:*

Be it known that I, CHARLES A. WILLIAMS, of the city of Joliet, in Will county, and State of Illinois, have invented certain Improvements in Thill-Couplings for Carriages, the description and operation of which I will proceed to explain, reference being had to the annexed drawings, making a part of this specification, in which—

Figure 1 is a side elevation; Fig. 2, a plan view on the top; Fig. 3, a front elevation; and Fig. 4, a plan view on the top of the thill-shank.

The nature of my invention consists in constructing the thill-coupling so that it will not rattle, and so that when it wears and gets loose it can be tightened by means of a bolt, and so constructed as to act on the principle of a ball and socket, the clip containing the sockets, and the thill-shank the ball.

In the drawings, $a$ represents that part of the coupling that encircles the axle, having attached to its front side the body $c$, terminating in two lips, $e$ and $i$, between which is held the shank $s$ by means of its conical projections or balls $z$ on either side, fitting closely into the corresponding cavities in the lips $e$ and $i$, as shown particularly in Fig. 2.

The lip $e$ is hinged to the body of the coupling $c$ at $o$ by means of a bolt passing through, so that the lip $e$ will swing like a gate from the hinge $o$. By this means the lips may be opened to receive the shank $s$ or take it out, as occasion may require.

The outer ends of the lips $e$ and $i$ are connected by means of a bolt having a screw-head at one end and a nut at the other, as shown at $x$, which is for the purpose of compressing the two lips $e$ and $i$ firmly against the conical projections of the shank $s$ as they rest in their corresponding cavities of the lips $e$ and $i$, so there can be no rattling or noise when the carriage is in motion.

This bolt $x$ may be used to tighten up the device almost instantly if it should be found to have become loose, and also to disengage the thills, when desired, to put the carriage away in close quarters.

The gate $e$ is represented as open at Fig. 3 and the shank $s$ out. By this means the use of rubber is entirely dispensed with. The wearing parts can be easily oiled, so that it will last as long as, if not longer than, the ordinary coupling, and is equally as neat and substantial in appearance.

I am aware that the two lips $i$ and $e$ have been held together by means of a bolt passing through, but not in front of the thill-socket, as in this case; and I do not claim the feature of uniting the two lips in the rear of the joint, for by that mode the two lips $i$ and $e$ are more liable to spread apart when a heavy draft is applied to the thill. The novel feature in this case is uniting the two lips $i$ and $e$ by the bolt $x$ in front of the thill-joint to thoroughly prevent spreading of the parts, as before stated.

Having thus described my invention, what I claim as new, and desire to secure by Letters Patent, is as follows:

The thill-clip $a$ $c$, having the permanent projecting lip $i$ and hinged lip $e$, provided with concave depressions on their opposite inner faces to receive the conical sides $z$ of the shank $s$, and united at their outer extremities by the tightening-bolt $x$, all arranged to operate substantially as and for the purposes set forth.

CHARLES A. WILLIAMS.

Witnesses:
 THOS. H. HUTCHINS,
 SAMUEL SHREFFLER, Jr.